United States Patent [19]
Wössner

[11] Patent Number: 4,640,377
[45] Date of Patent: Feb. 3, 1987

[54] MOTOR VEHICLE

[76] Inventor: Heinz Wössner, P.O. Box 1140, D-7605 Bad Peterstal-Griesbach, Fed. Rep. of Germany

[21] Appl. No.: 628,586

[22] PCT Filed: Nov. 15, 1983

[86] PCT No.: PCT/EP83/00302
§ 371 Date: Jul. 13, 1984
§ 102(e) Date: Jul. 13, 1984

[87] PCT Pub. No.: WO84/01923
PCT Pub. Date: May 24, 1984

[30] Foreign Application Priority Data

Nov. 16, 1982 [DE] Fed. Rep. of Germany ....... 3242408

[51] Int. Cl.$^4$ ................. B62D 53/00; B62D 53/02; B60D 15/00
[52] U.S. Cl. ................. 180/9.1; 301/36 A; 301/43; 305/39; 152/209 R
[58] Field of Search ............ 180/9.1, 9.5, 7.1, 7.2, 180/15, 16, 194, 196; 305/6, 7, 35 EB, 39, 57; 301/43, 46, 36 A, 13 R, 13 A; 152/220, 209 R

[56] References Cited

U.S. PATENT DOCUMENTS

| 919 | 9/1838 | Chapin | 180/194 |
| 1,284,385 | 11/1918 | Linden | 301/43 |
| 2,256,570 | 9/1941 | Kopczynski | 180/7.1 |
| 2,708,978 | 5/1955 | Robitaille | 305/35 EB |
| 2,786,540 | 3/1957 | Sfredda | 180/7.1 |
| 4,102,423 | 7/1978 | Reid | 180/7.1 |
| 4,124,124 | 11/1978 | Rivet | 180/6.48 X |
| 4,223,753 | 9/1980 | Bradbury | 180/7.1 |

FOREIGN PATENT DOCUMENTS

| 640138 | 7/1928 | France . | |
| Ad.34571 | 9/1929 | France . | |
| 57-956 | 1/1982 | Japan | 305/57 |

Primary Examiner—John A. Pekar

[57] ABSTRACT

A motor vehicle having at least one profiled tread with transverse profiling with segments in the form of cleats, transverse ribs or the like. The profiled tread consists of two partial profiles which are adjustable relative to one another in the running direction, whereby the vehicle has high cross-country capability, as well as great smoothness of operation when traveling over flat surfaces.

11 Claims, 10 Drawing Figures

MOTOR VEHICLE

The invention relates to a motor vehicle having at least one profiled tread with transverse profiling, whose segments in the form of cleats, transverse ribs or the like are arranged with spacing in the running direction.

Motor vehicles having profiled treads, such as crawler or track-laying vehicles, are usable in many ways on account of their cross-country capability. Such profiled treads, however, have the disadvantage of rough running when the vehicle is traveling over flat terrain. A particular disadvantage results when rounding curves or turning in place, since the road surface is considerably damaged thereby. Similar problems also occur in vehicles in which the profiled treads are formed by cleats on the running wheels.

It is the object of the invention to create a vehicle having great cross-country capability, but at the same time being distinguished by very smooth running on flat surfaces.

This object is achieved in accordance with the invention in that the profiled tread consists of two partial profiles which are adjustable relative to one another in the running direction.

The division of the profiled tread into two partial profiles which are adjustable relative to one another in the direction of movement makes it possible to dispose the segments of the two partial profiles such that the segments of the one partial profile are offset laterally, but are situated at the intervals between the segments of the other partial profile. The vehicle thus contacts the ground with the segments of both partial profiles.

The reduction to practice of the partial profiles can be accomplished in a variety of ways. For example, the partial profiles can be formed on two coaxial running wheels situated side by side. These two wheels, each bearing one partial profile, can form the rear wheel, for example, of a motorcycle. It is also possible, however, to provide the partial profiles on crawler or track-laying vehicles. In this case, the vehicle has two crawler belts on each side, each provided with a partial profile. Also, it is possible to form the partial profiles of one profiled tread of one wheel and one crawler belt.

In all applications, relatively smooth running will result when the partial profiles are offset relative to one another, since then the gaps between the segments of the one partial profile are equalized by the segments of the other partial profile. This smooth running results not only in less vibration of the vehicle itself but also in a reduction of noise. On account of the better distribution of the load, negotiating curves and turning in place result in far less damage to the ground surface by the vehicle.

If the profiled treads are offset such that the segments are situated side by side, the vehicle has the cross-country capability of other known vehicles of its kind.

It is desirable that the segments of one profiled tread be adjustable by at least half of the mean distance between two successive segments, so that the segments of the one partial profile can be set to the center between the segments of the other partial profile. The gap between the segments should be of approximately the same size and shape as the segments themselves.

The invention will be explained below by way of example, with the aid of FIGS. 1 to 8, wherein:

FIGS. 1 to 4 are elevations of a pair of running wheels of one side of a vehicle, each wheel having a partial profile of a profiled tread, as seen from the front and from the side, FIGS. 5 to 8 are similar representations of a pair of running wheels on one side of a vehicle over which wheels runs a crawler belt and FIGS. 9 and 10 illustrate further embodiments of the invention.

FIGS. 1 to 4 show the construction of a profile tread on two coaxial running wheels 13 of a vehicle V. Each running wheel 13 has a partial profile 11. The two partial profiles of the running wheels together form a profiled tread. The wheels are rotatable relative to one another and thus the partial profiles are adjustable relative to one another. The partial profiles consist of segments or cleats 12 whose spacing is approximately equal to the width of the cleats. The gaps between the cleats are of a shape complementary to that of the cleats. In FIGS. 1 and 2 is shown the wheel working position in which a vehicle V equipped with such wheels, e.g., a motorcycle whose rear wheel has these two wheels, runs on flat ground. In this case the cleats 12 are offset from one another such that the cleats of the one partial profile are situated at the gaps between the cleats of the other partial profile. Thus the two wheels come in contact with the ground fully at their cleats and partially at the gaps between the cleats.

Figure 1:
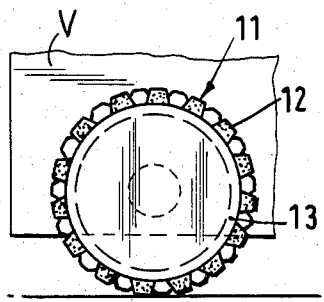
Figure 2:
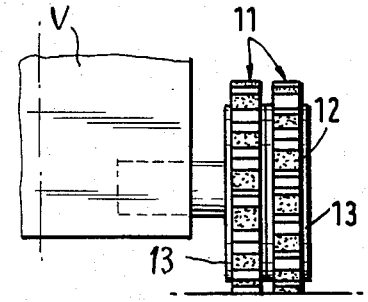
Figure 3:
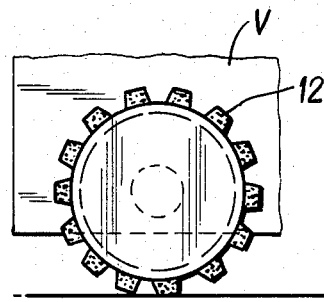
FIGS. 3 and 4 show the working position for cross-country travel, in which the cleats and the interstices between them are in line with one another.
Figure 4:
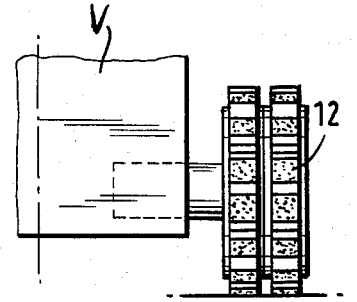
Figure 5:
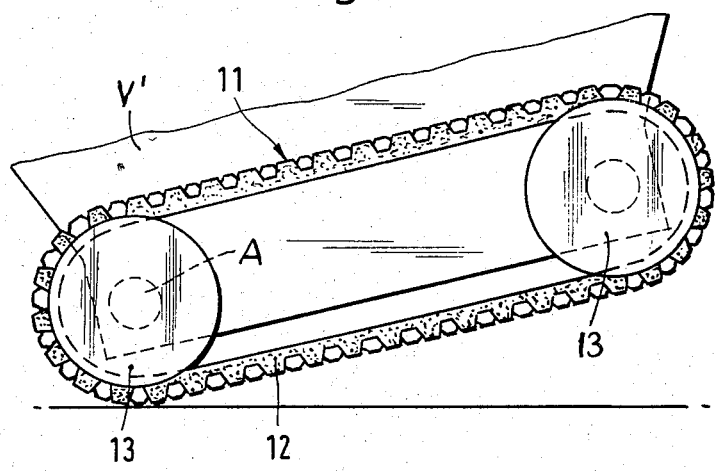
FIGS. 5 to 8 show the configuration of the partial profiles 11 of a tread on crawler belts which are guided over two rear and two front running wheels.
Figure 6:
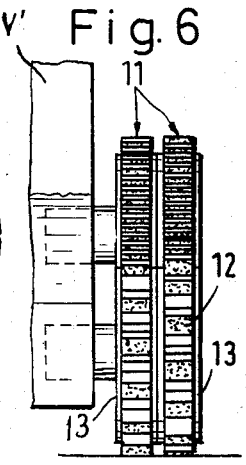

FIGS. 5 and 6 show the working position of the crawler belts, which are displaceable relative to one another, for travel over a flat ground surface. The front wheels of the vehicle V' are raised upwardly by the rotation about the rear axle A, so that conditions with regard to the bearing surface are similar to those of the cleated wheels in FIGS. 1 and 2, i.e., that a crawler vehicle V' equipped with such crawler belts can run like a vehicle provided with normal wheels. In this case, of course, at least one additional wheel, not shown, by which the vehicle is also supported on the ground, is required for steering. In comparison with normal crawler vehicles, the advantage is thereby obtained that damage to the surface of the ground can be kept low on account of the favorable load distribution.

Figure 7:
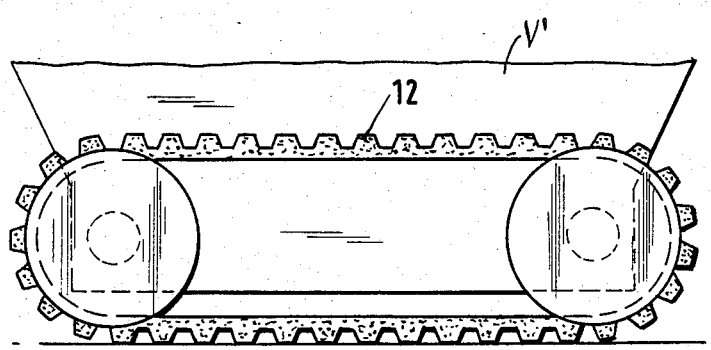
Figure 8:
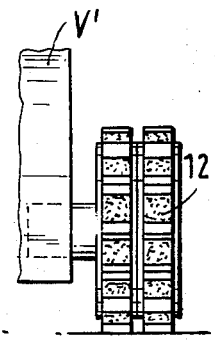

FIGS. 7 and 8 again show the working position in which the vehicle runs cross-country, i.e., the profile segments or cleats 12 of the crawler belts as well as the interstices between them are aligned with one another. The truck, in this working position, is rotated back to the normal horizontal position. The wheel by which the vehicle is steered, and which is not shown, can also lie on the ground or be raised up from it.

Figure 9:
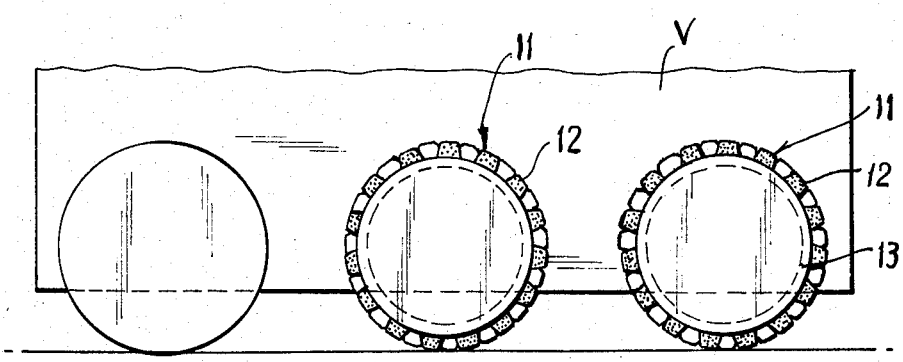

FIG. 9 shows a three-wheeled motor truck, two running wheels 13 of which have partial profiles as illustrated in FIGS. 1 to 4.

Figure 10:
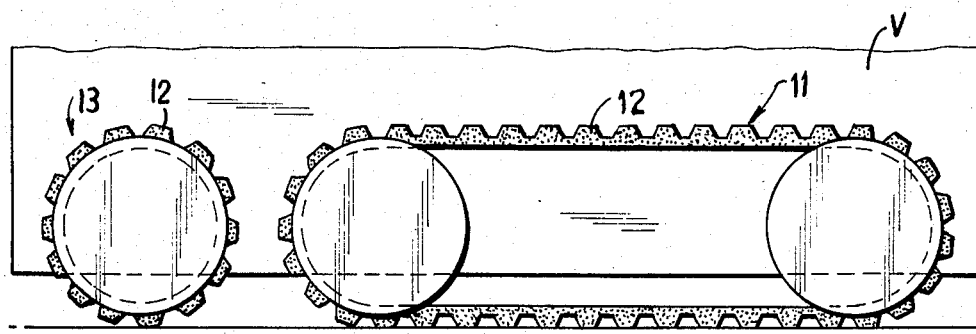

FIG. 10 shows a vehicle with a wheel 13 and a crawler belt 11, each having a partial profile 12.

What is claimed is:

1. A crawler vehicle having two sides, two crawler belts on each side of the vehicle, each crawler belt having a profiled tread with transverse profiling having segments in the form of cleats, transverse ribs or the like, said segments being arranged in spaced relationship in the running direction of the respective belt, each profiled tread comprising two partial profiles which are adjustable relative to one another in the running direction.

2. A vehicle according to claim 1, wherein the crawler belts are guided over at least two running wheels.

3. A vehicle according to claim 1, wherein the partial profiles are adjustable by at least half the distance between centers of two successive segments.

4. A vehicle according to claim 3, comprising front and rear wheels, the front wheels being adjustable in elevation.

5. A vehicle according to claim 3, wherein at least part of the vehicle is tiltable about an axle of the vehicle.

6. A vehicle according to claim 3, wherein the segments of the partial profiles are spaced from each other by an amount approximately equal to the width of the segments.

7. A vehicle according to claim 3, wherein gaps between the segments are complementary in shape to the segments.

8. A vehicle having two sides, a wheel and a crawler belt on each side of the vehicle, each wheel and each crawler belt having a profiled tread with transverse profiling having segments in the form of cleats, transverse ribs or the like, said segments being arranged in spaced relationship in the running direction of the respective wheel and belt, each profiled tread comprising two partial profiles which are adjustable relative to one another in the running direction.

9. A vehicle having two wheels, each wheel having a profiled tread with transverse profiling, having segments in the form of cleats, transverse ribs, or the like, said segments being arranged in spaced relationship in the running direction of the respective wheel, each profiled tread comprising two partial profiles which are adjustable relative to one another in the running direction, the partial profiles being formed on coaxial running wheels.

10. A vehicle having two wheels, each wheel having a profiled tread with transverse profiling, having segments in the form of cleats, transverse ribs, or the like, said segments being arranged in spaced relationship in the running direction of the respective wheel, each profiled tread comprising two partial profiles which are adjustable relative to one another in the running direction, said wheels each having said partial profile being disposed in the rear of the vehicle.

11. A vehicle having a three-wheeled motor truck with two wheels, each wheel having a profiled tread with transverse profiling, having segments in the form of cleats, transverse ribs, or the like, said segments being arranged in spaced relationship in the running direction of the respective wheel, each profiled tread comprising two partial profiles which are adjustable relative to one another in the running direction, said wheels each having a partial profile being disposed on each side of the vehicle.

* * * * *